INVENTOR
GORDON E. HINES

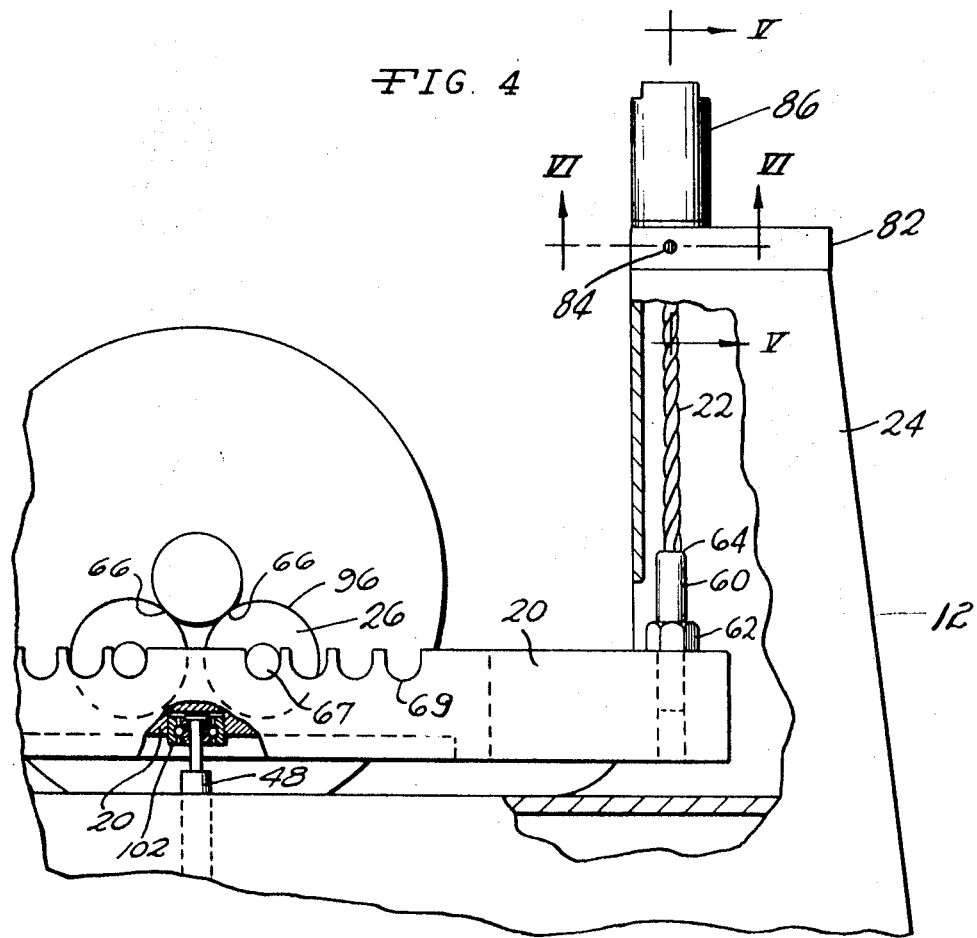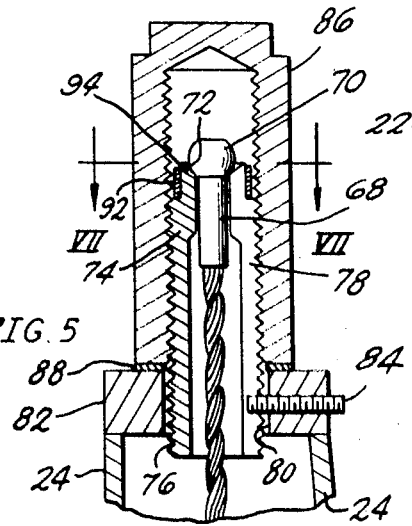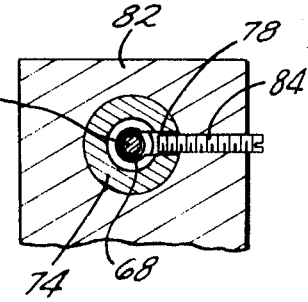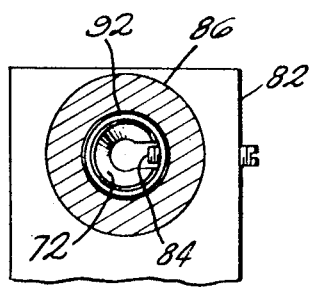

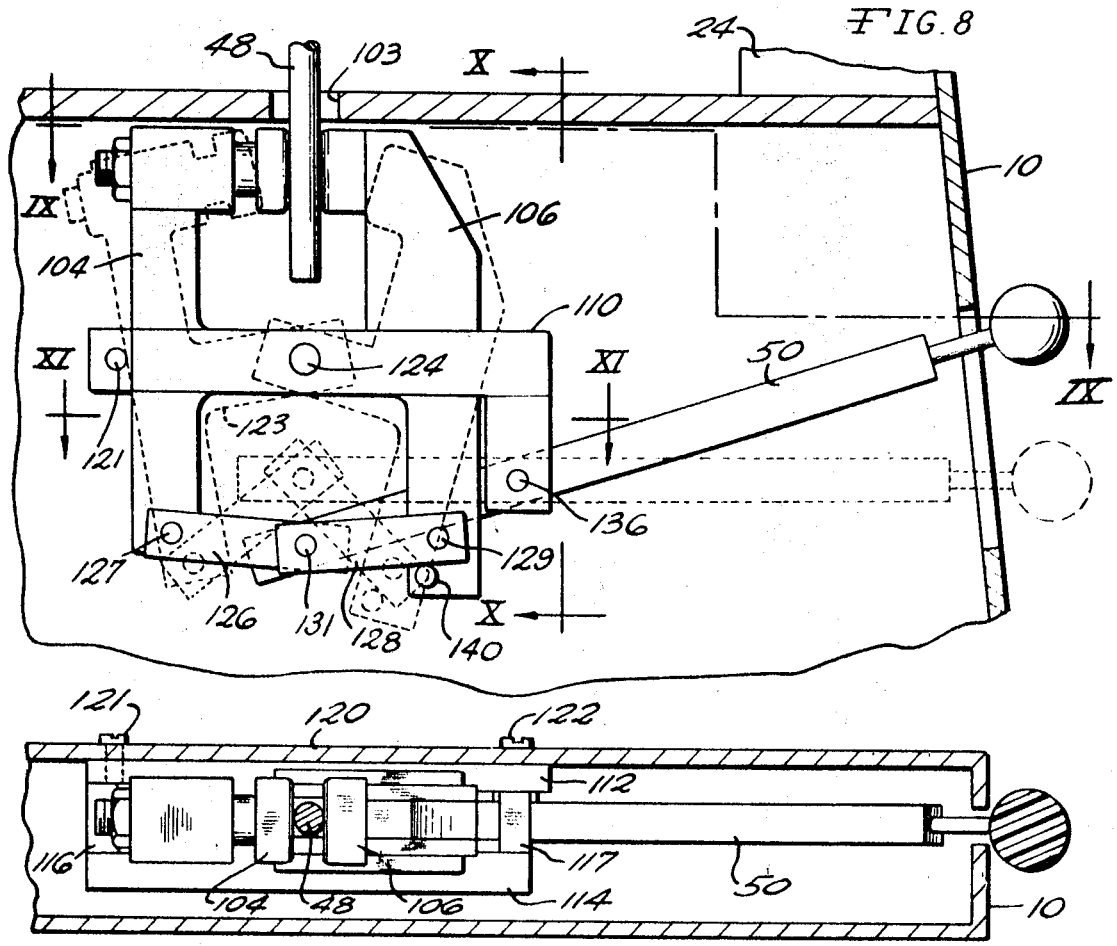
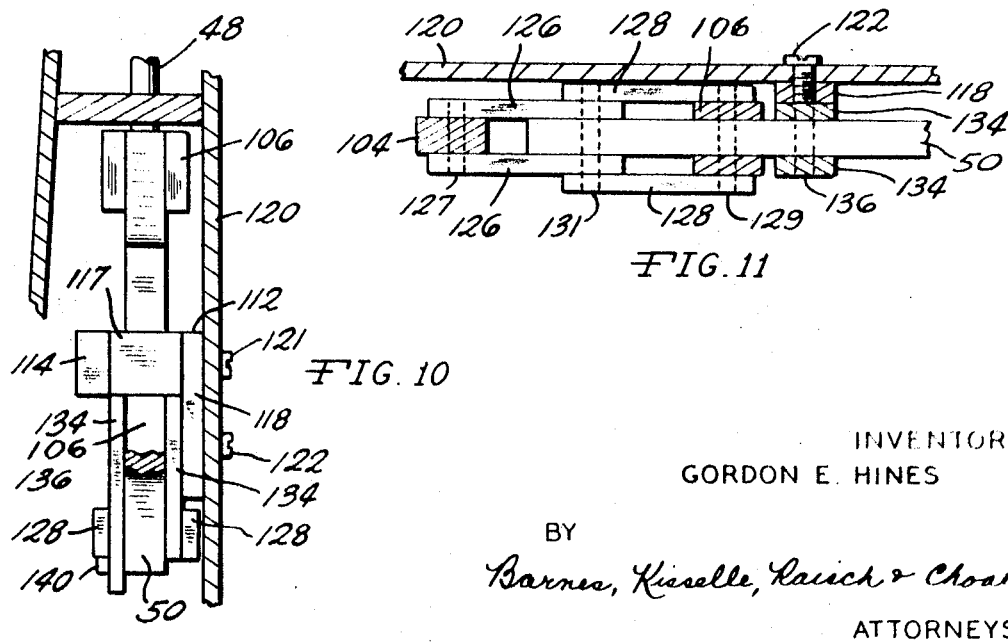

United States Patent Office

3,611,792
Patented Oct. 12, 1971

3,611,792
CABLE SUSPENSION SYSTEM FOR BALANCING MACHINES
Gordon E. Hines, Ann Arbor, Mich., assignor to Balance Technology, Inc., Ann Arbor, Mich.
Filed July 28, 1969, Ser. No. 845,248
Int. Cl. G01m 1/16
U.S. Cl. 73—478                        15 Claims

ABSTRACT OF THE DISCLOSURE

A soft suspension system for a balancing machine wherein the bearing carriers are suspended by cables. The cables are mounted on the carrier by a rigid connection and to stanchions of the machine by vertically adjusting means that adjust the height of the carrier without changing the length of the cables. Locking jaws having a particular toggle linkage actuator are provided to lock the carriers against vertical and lateral motion while permitting the carriers to pivot.

---

This invention relates to balancing machines and, more particularly to a soft suspension system for the same.

Soft balancing suspensions are widely used in dynamic balancing machines to allow the rotor under test to vibrate in a generally horizontal plane. Indications of unbalance are obtained by measuring the displacement of the geometric axis of the rotor with respect to its mass axis during rotation of the part. Numerous arrangements have been suggested for soft suspensions that permit free oscillation of the rotor. Although it has been suggested to use flexible cables to suspend bearing carriers that support the rotor, such cable suspensions are not believed to have been widely accepted on a commercial basis due to several disadvantages when compared to other soft suspensions. One such cable suspension is disclosed in United States Pat. 2,656,710, granted to I. A. Weaver et al. on Oct. 27, 1953, and entitled "Means for Adjustment of Balancing Machines." However, applicant has found that a flexible cable suspension does have certain advantages over other types of soft suspensions for numerous applications, for example, in connection with vibratory calibration on a static rotor as disclosed in the aforementioned Weaver et al. patent. Hence applicant has found it desirable to improve the cable suspension of the general type disclosed in the aforementioned Weaver et al. patent so that the suspension is more stable and operates effectively in a wider variety of balancing applications.

Hence the objects of the present invention include providing a soft suspension system for a balancing machine that is constructed simply and economically; that operates effectively to provide free oscillatory motion of a part under test; that facilitates vertical adjustment of the suspension system while maintaining correlatable test results regardless of the height at which the carriers are positioned; that is adapted to operate effectively in balancing applications where the carrier is locked against oscillatory motion but free to pivot; that provides the last-mentioned pivoting operation with a normally soft suspension regardless of accidental horizontal displacement between the two carriers or intentional horizontal displacement that is required due to the configuration of the part; that is self-aligning to minimize damage to the rotor and/or to bearings on the carrier when the bearings are not in accurate horizontal alignment; and/or that is useful over a wide weight range of parts.

Other objects, features and advantages of the present invention will become apparent in connection with the following description, the appended claims and the accompanying drawings in which:

FIG. 4 is an enlarged fragmentary end view, partly broken away and partly in section, to better illustrate the soft suspension system of the present invention;

FIG. 5 is a vertical section taken on line 5—5 of FIG. 4;

FIG. 6 is a horizontal section taken on line 6—6 of FIG. 4;

FIG. 7 is a horizontal section taken on line 7—7 of FIG. 5 with the ball of a ball and socket removed;

FIG. 8 is a vertical section illustrating a locking mechanism in the stanchion of the balancing machine to prevent lateral and vertical motion of the carrier during certain balancing procedures;

FIG. 9 is a horizontal section taken on line 9—9 of FIG. 8;

FIG. 10 is a vertical section taken on line 10—10 of FIG. 8; and

FIG. 11 is a horizontal section view taken on line 11—11 of FIG. 8.

Figure 1:
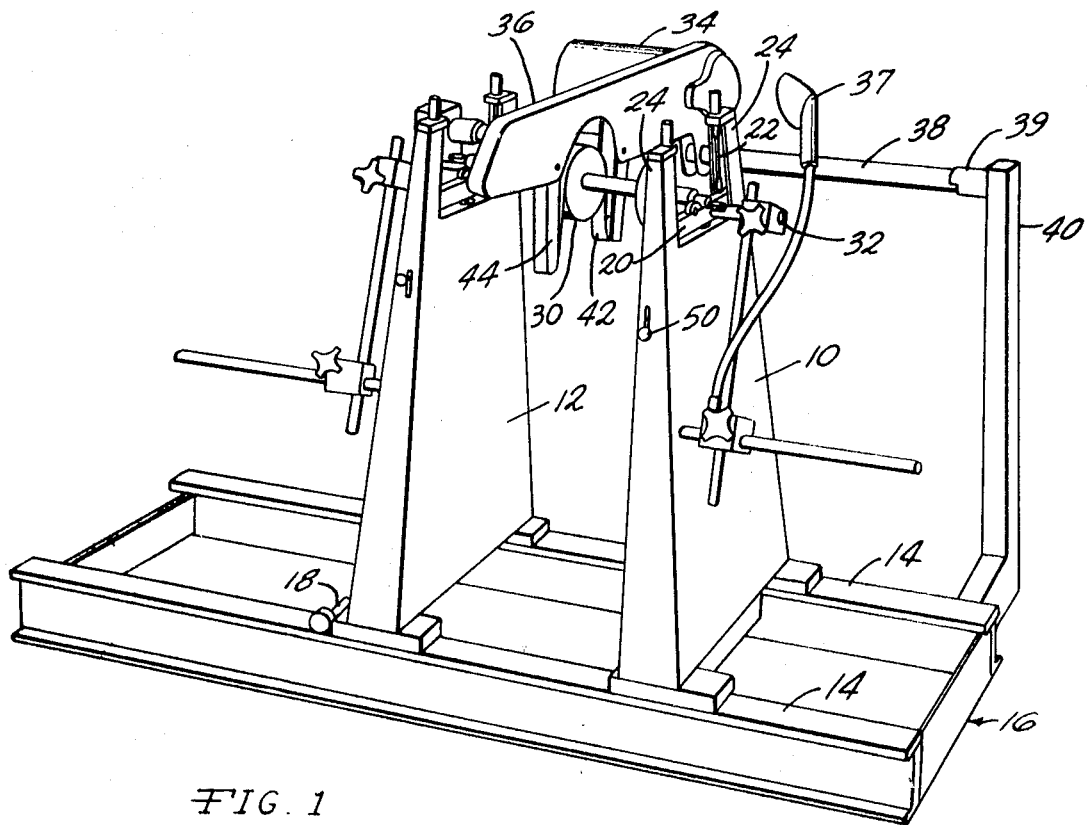
FIG. 1 is a perspective view of a balancing machine having the soft suspension system of the present invention.
Figure 2:
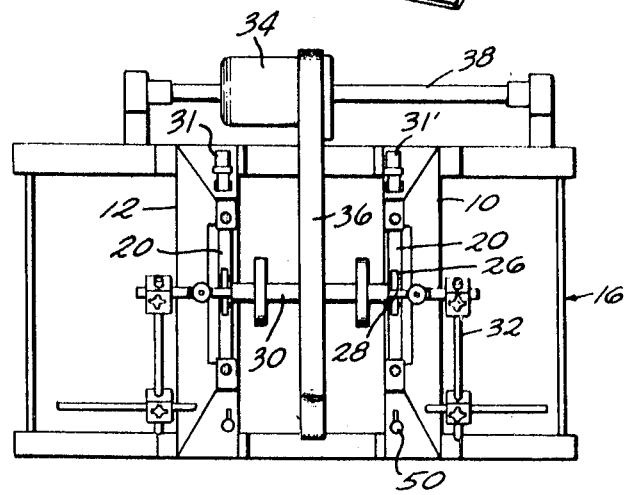
FIG. 2 is a top view of the balancing machine of FIG. 1.
Figure 3:
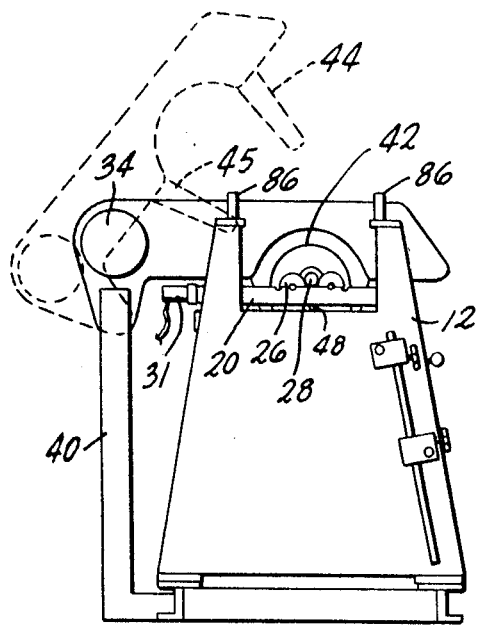
FIG. 3 is an end view of the balancing machine taken from the left side as viewed in FIG. 1 with certain parts repositioned.

Referring more particularly to FIGS. 1–3, the illustrated balancing machine generally comprises a pair of complementary, right-hand and left-hand, stanchions 10 and 12 that are spaced apart horizontally and mounted on rails 14 of a base 16. Stanchion 10 is stationary whereas stanchion 12 is mounted on rails 14 for horizontal movement by suitable means such as a motor-driven pinion and rack (not shown) operated by lever 18 to adjust the horizontal spacing between the stanchions. Inasmuch as stanchions 10, 12 are substantially identical, only one of the stanchions and corresponding portions of the suspension system mounted thereon will be described in greater detail with like reference numerals identifying like parts on the stanchions 10, 12.

A bearing carrier 20 is suspended on stanchion 10 by a pair of flexible cables 22 which are rigidly fastened at their lower ends on respective opposite ends of carrier 20 and are vertically adjustably fastened at their upper ends on respective upright arms 24 on stanchion 10. Arms 24 are spaced apart laterally of the machine and project substantially above the carrier 20. A pair of adjustable roller bearings 26 mounted on each carrier 20 rotatably support shaft end portions 28 of a test rotor 30. Adjustable end thrust retainers 32 are mounted on each of the stanchions 10, 12 outboard of the rotor 30 to engage the opposite ends of the rotor and prevent axial motion of the rotor. Retainers 32 have suitable bearings or rollers engaging rotor 30 to allow free rotation and oscillation thereof during testing. Conveniently, one of the retainers 32 serves as a support for strobe light 37. Carriers 20 project rearwardly though stanchions 10, 12 and mounted directly on the rear end of the left and right carriers 20 is a respective transducer pickup 31, 31' that moves with its carrier during translation thereof and provides an electical output signal representing the displacement of the carrier. In the preferred embodiment, the pickups 31, 31' are inertia-type transducers known as a seismic pickup. Other suitable transducers could also be used, for example, piezoelectric crystal pickups of the general type disclosed in the aforementioned Weaver et al. patent.

Rotor 30 is rotatably driven by a motor 34 mounted on one end of a drive arm 36 which in turn is mounted on a horizontal rod 38 journalled at 39 on uprights 40. Arm 36 extends radially outwardly from rod 38 toward the front of the machine and over rotor 30 when the arm is in its operative position illustrated. An endless belt 42 driven by motor 34 is housed in the arm 36 by a suitable arrangement of rollers mounted on the arm 36 and on pivoted, downwardly depending secondary arms 44, 45. The belt 42 travels downwardly on arms 44, 45 and upwardly over and partially encircling rotor 30 to revolve the same. A suitable rack and pinion (not shown) on arm 36 and rod 38 allow selective horizontal positioning of the arm depending on the configuration of the test part. The radial drive arm 36 and rod 38 can pivot as a unit to the raised position illustrated in dotted lines in FIG. 3 to disengage the drive from the rotor 30. This also facilitates assembly and disassembly of rotor 30 on carriers 20 and other operations such as adding weights to the rotor. Although the pivoted drive arm 36 is useful in the preferred embodiment of the balancing machine being described, it will be understood that other suitable driving mechanisms could also be used. However, the details of the drive mechanism including the drive arm 36 and the mounting of the belt 42 therein are disclosed in greater detail in my copending application filed concurrently with the present application and entitled "Drive Mechanism for Balancing Machine."

Mounted inside stanchions 10 and 12 are locking clamps adapted to selectively engage a pin 48 journalled in and depending downwardly from the carrier 20. The clamps are operated by suitable levers 50 when it is desired to lock the carriers against horizontal translation as will be explained more fully in connection with FIGS. 8-11.

Referring more particularly to the cable suspension illustrated in greater detail in FIGS. 4-7, each of the cables 22 is securely fastened at its lower end in a cable end fitting 60 having a lower end portion threaded in carrier 20. A suitable lock nut 62 threaded on the fitting 60 is provided to assure that the fitting 60 is rigidly and securely fastened to the carrier 20. In accordance with one important aspect of the present invention, the fitting 60 is made of rigid material so that the juncture between the upper end of the fitting 60 and the cable 22 defines a flexure point at 64. The flexure point is located substantially vertically above the points 66 of engagement between bearings 26 and the shaft end portions 28 on rotor 30. Bearings 26 are ball bearing rollers on shafts 67 and the lateral position of the bearings can be adjusted by means of the several grooves 69 to accommodate different sized rotors. Grooves 69 also facilitate setting the contact points 66 below the flexure points 64. Although rollers 26 are preferred, the present invention also contemplates carriages corresponding to carriage 20 and having a nylon V-block bearing.

The upper end of cable 22 is fastened in an upper end fitting 68 which has a terminal ball portion 70. Ball portion 70 seats in a socket 72 on the upper end of a sleeve 74. Sleeve 74 has external threads 76 and an axial slot 78 that extends longitudinally the full length of the sleeve and radially through the side wall of the sleeve. Sleeve 74 passes freely through a suitable aperture 80 in a top plate portion 82 of the arm 24. A set screw 84 threaded through plate 82 projects radially into slot 78. Sleeve 74 is threaded in an elongated cap nut 86 that is supported on a top face of plate 82. Nut 86 is spaced from plate 82 by a washer 88 to facilitate rotation of the nut on the plate. When nut 86 is rotated, sleeve 74 is prevented from rotation by screw 84 so that the sleeve moves upwardly or downwardly, depending upon the direction that nut 86 is rotated, to raise and lower cable 22. The height of carriage 20 is set by adjusting the nuts 86 on both cables 22. Slot 78 serves as a guide for the screw 84 during vertical adjustment of the cable 22 and also facilitates assembly of the cable 22 into the sleeve 74 after the end fitting 70 has been attached to the cable. After the cable has been inserted in the sleeve, a retaining ring 92 is pressed on an inwardly stepped end portion 94 of the sleeve 74 to restrain circumferential expansion of the sleeve 74 due to the weight on cable 22. Ring 92 also serves to retain cable 22 assembled in sleeve 74.

The cable suspension described hereinabove provides several advantages over prior art soft suspensions. The location of the flexure point 64 between cable 22 and fitting 60 above the contact points 66 provides a well-balanced suspension. With the flexure points 64 disposed substantially above the contact points 66, for most test parts the flexure points 64 will also be disposed above the center of mass of the part. Bearings 26 may have either crowned or flat peripheral bearing surfaces 96. When bearings having flat surfaces 96 are used, the suspension system will be self-aligning since carriages 20 can tilt from vertical. Therefore, precise horizontal alignment of the bearings 26 is not essential. The bearings 26 at the respective stanchions 10, 12 could accidentally be displaced vertically from each other or vertical displacement may be required depending upon the configuration of the part being balanced. The self-aligning feature eliminates excessive end thrust and possible galling of the rotor shaft portions 28 or of the bearings 26.

The particular vertical adjustment mechanism described offers a further advantage in that the natural frequency of the suspension system depends primarily upon the length of the pendulum, i.e., the distance between ball 70 and carriage 20, and is independent of the mass supported on the carriage. Since the pendulum length does not change when the height of the carriage 20 is changed, the machine accommodates itself to a wide weight range of parts using the same suspension system. The output signal from transducers 31, 31' will not be affected merely by a height adjustment of carriers 20. Although cables 22 are braided metal cables in the preferred embodiment, other flexible cable-like suspension means are also contemplated by the present invention depending on the parts to be tested. For example, plastic or fiber glass cord or other material having sufficient strength to support the part and provide the necessary flexibility could be used. On very light parts a length of cotton cord would be sufficient.

Referring again to FIG. 4 and FIGS. 8-11, the pin 48 is pivotally mounted in the bottom of carriage 20 by a bearing 102 press fitted in the carriage 20. With the carriage 20 at rest, the rotational axis of pin 48 is disposed substantially vertically and intersects the rotational axis of rotor 30. Pin 48 projects downwardly from carrier 20 through a slot 103 in a transverse web portion of the stanchion 10. Mounted interiorly of the stanchion 10 is a locking arrangement generally comprising scissor jaws 104, 106 that are arranged to clamp pin 48 and thereby prevent both vertical displacement and horizontal displacement of the carrier 20 for certain balancing procedures. The jaws 104, 106 are mounted on a generally rectangular frame 110 formed by a back plate 112, a front plate 114 and two end plates 116, 117. Back plate 112 has an integral downwardly depending leg 118. Frame 110 in turn is fastened on a back panel 120 of stanchion 10 by screws 121, 122 threadably engaged in plate 112 and leg 118, respectively.

Each of the jaws 104, 106 has inwardly projecting tabs 123 which are pivotally mounted on the frame 110 by a common pin 124 so that the jaws pivot about the common axis of pin 124 in a vertical plane. Fastened on the lower ends of the jaws 104, 106, below pin 124 are two pairs of toggle links 126, 128, respectively. Links 126 are pivoted on jaw 104 by a pin 127 and links 128 are pivoted on jaw 106 by a pin 129. The inner ends of the links are pivoted together and to the inner end of lever 50 by a single pin 131. Lever 50 is pivotally mounted on a pair of spaced apart arms 134 by a pin 136. Arms 134 are integral with and depend downwardly from the end plate 117. With the jaws in the closed position illustrated in full lines in FIG. 8, in the pin restraining position, links 126, 128 are slightly downwardly over center and are in compression. As the jaws 104, 106 are being closed, they engage pin 48 before the links reach their aligned center position. Further upward pivoting of the lever 50 and corresponding downward movement of pin 131 moves the links 126, 128 over center and places them in compression to maintain the jaws in the clamped position illustrated in full lines. A suitable stop is provided to limit downward travel of the links after they move over center, for example, a pin 140 at the lower end of jaw 106 beneath link 128.

The jaws 104, 106 are opened by pivoting lever 50 downwardly about pin 136. The links 126, 128 pivot upwardly as illustrated in dashed lines, causing jaws 104, 106 to pivot on pin 124 out of engagement with pin 48 to free carrier 20. Frame 110 should be properly positioned so that when jaws 104, 106 close on pin 48, the axis of the pin will be midway between the arms 24 and rotor 30 centered on stanchions 10, 12. To assure proper centering of pins 48, jaw 104 has an adjustable head as illustrated.

The particular locking arrangement described hereinabove is also specially suited for use with the cable suspension described hereinabove. Due to the self-aligning action of the cable suspension, pin 48 may be slightly inclined or titled to the vertical (in a vertical plane containing the rotational axis of the rotor 30, to the left or to the right as viewed in FIG. 10). Even though pin 48 is inclined vertically, when jaws 104, 106 are closed, they will clamp pin 48 in the inclined position. This feature is particularly desirable where one of the carriages 20 is locked against translation and the displacement of the other free carrier 20 is measured when rotor 30 is rotated. Should pin 48 be inclined slightly to the vertical, it will be held in this position to restrain both vertical displacement of the pin and also lateral horizontal displacement of the carriage while permitting the carrier to pivot about the bearing 102.

The cable suspension described hereinabove is useful in a wide variety of dynamic balancing applications using conventional techniques wherein rotor 30 is revolved and the oscillation of the rotor is measured. The cable suspension is also useful in connection with vibratory calibration on a static rotor.

It will be understood that the cable suspension system for balancing machines has been described hereinabove for purposes of illustration and is not intended to indicate limits of the present invention, the scope of which is defined by the following claims.

I claim:

1. In a balancing machine wherein a part under test vibrates in a generally horizontal plane in accordance with unbalance of said part and wherein said part is supported by a pair of carriers spaced apart along a generally horizontal axis of said part, means for suspending one of said carriers for free vibration substantially in said plane comprising a pair of vertical arms disposed at respective opposite sides of said axis and projecting upwardly above said plane, first flexible means mounted at its upper end on an upper end portion of one of said arms and depending generally downwardly therefrom, first mounting means on said one carrier laterally outwardly of said axis, said one carrier having bearing means adapted to engage said part at an uppermost contact point, said flexible means having a lower end mounted in said mounting means so as to define a first flexure point at the juncture therebetween, second flexible means mounted at its upper end on an upper end portion of the other of said arms and depending generally downwardly therefrom, second mounting means on said carrier disposed laterally outwardly of said axis in a horizontal direction away from said first mounting means, said second flexible means having its lower end mounted in said second mounting means so as to define a second flexure point at the juncture therebetween, and wherein said first flexure point and said second flexure point are above said uppermost contact point.

2. The balancing machine set forth in claim 1 wherein said first flexible means is mounted on said one arm by vertically adjustable means to vary the vertical position of said flexible means and thereby vary the height of said one carrier.

3. The balancing machine set forth in claim 2 wherein said vertically adjustable means includes means defining an uppermost second flexure point for said first flexible means and means for maintaining the distance between said first and said second flexure points of said first flexible means constant at different vertical positions of said first flexible means.

4. The balancing machine set forth in claim 3 wherein said vertically adjustable means comprises an externally threaded member, nut means threadably engaged with said threaded member, said nut means being arranged and disposed on said arm so that said arm restrains vertically downward movement of said nut means, and wherein said first flexible means is mounted on said threaded member at said second flexure point.

5. The balancing machine set forth in claim 4 wherein said threaded member comprises a sleeve having an axial slot extending from end to end of said sleeve and adapted to facilitate insertion of said flexible means through said slot during assembly thereof, ball socket means on an upper end of said sleeve, a ball fixed on the upper end of said first flexible means and seated in said socket, said flexible means extending upwardly through a passageway in said one arm, a horizontal shoulder on said one arm around said passageway and wherein said nut means is threaded on said sleeve above said shoulder and is adapted to bottom on said shoulder.

6. The balancing machine set forth in claim 5 wherein said sleeve has an inwardly stepped upper end at said socket and wherein an annular retainer is mounted on said inwardly stepped upper end to restrain circumferential expansion thereof in response to downward force on said ball and retain said first flexible means in said sleeve.

7. The balancing machine set forth in claim 1 wherein said arms are fixed on a vertical stanchion and wherein said balancing machine further comprises selectively operable means for locking said one carrier against vertical and lateral displacement relative to said stanchion while permitting said one carrier to pivot about a generally vertical axis located substantially in a vertical plane containing said axis of said part.

8. The balancing machine set forth in claim 7 wherein said stanchion has a transverse web portion extending between said arms below said carrier and wherein said carrier locking means comprises a pin mounted on said one carrier for rotation on said pivot axis, said shaft extending downwardly from said carrier through a slot in said web and wherein said locking means further comprises clamping means mounted on said stanchion below said web to clamp said pin against movement relative to said stanchion.

9. The balancing machine set forth in claim 8 wherein said clamping means comprises a pair of jaws mounted on said stanchion for pivotal movement laterally of said stanchion, said jaws being adapted to selectively clamp said pin so that when said jaws are open said pin is freed to permit vibration of said one carrier and when said jaws are closed said pin restrains vibration of said one carrier while permitting said one carrier to pivot on said pin, said jaws also being mounted on said stanchion to receive said pin when said pin is inclined at an angle to vertical in said vertical plane and to retain said pin in said vertically inclined position when said jaws are closed.

10. The balancing machine set forth in claim 1 wherein said first flexible means is a braided metal cable.

11. In a balancing machine wherein a part under test vibrates in a generally horizontal plane in accordance with unbalance of said part, said part is supported by a pair of carriers spaced apart along a generally horizontal axis of said part, and wherein said carriers are mounted on stanchions by a soft suspension system, that improvement comprising selectively operable means for locking one of said carriers against vertical and horizontal displacement while permitting said one carrier to pivot about a generally vertical axis located substantially in a vertical plane containing said axis of said part, and wherein said carrier locking means comprises a pin journalled on said one carrier by bearing means for rotation on said vertical pivot axis, said pin extending downwardly from said one carrier and being fixed therein by said bearing means against relative vertical and horizontal displacement therebetween, and clamping means for fixedly engaging said pin against movement relative to said stanchion comprising a pair of jaws mounted on said stanchion for pivotal movement laterally of said stanchion, said jaws being adapted to selectively clamp said pin so that when said jaws are open said pin is freed to permit vibration of said one carrier and when said jaws are closed said pin restrains both horizontal and vertical vibration of said one carrier while permitting said one carrier to pivot on said pin, said jaws also being mounted on said stanchion to receive said pin when said pin is inclined at an angle to vertical in said vertical plane and to retain said pin in said vertically inclined position when said jaws are closed.

12. The balancing machine set forth in claim 11 wherein said carrier locking means comprises toggle linkage means operatively connected to said jaws to operate said jaws.

13. In a balancing machine wherein a part under test vibrates in a generally horizontal plane in accordance with unbalance of said part and wherein said part is supported by a pair of carriers spaced apart along a generally horizontal axis of said part, means for suspending one of said carriers for free vibration in said plane comprising a pair of vertical arms disposed respectively at opposite sides of said axis and projecting upwardly above said plane, first flexible means mounted at a lower end thereof on said one carrier at one side of said axis, first vertical adjustment means mounting said flexible means at its upper end on an upper end portion of said one of said arms for vertical adjustment of said flexible means, second flexible means mounted at a lower end thereof on said carrier at the other side of said axis and second vertical adjustment means mounting said second flexible means at its upper end on an upper end portion of the other of said arms for vertical adjustment of said second flexible means and wherein said first flexible means has a first flexure point adjacent its lower end and wherein said first vertical adjustment means comprises means defining an uppermost second flexure point adjacent said upper end of said first flexible means and means for maintaining the distance between said first and said second flexure points constant at different vertical positions of said first flexible means.

14. The balancing machine set forth in claim 13 wherein said means for vertically adjusting said first flexible means comprises an externally threaded sleeve having an axial slot extending from end to end of said sleeve and adapted to facilitate insertion of said first flexible means through said slot during assembly thereof, ball socket means on an upper end of said sleeve, a ball fixed on said upper end of said first flexible means and seated in said socket, said first flexible means extending upwardly through a passageway in said one arm, a horizontal shoulder on said one arm around said passageway, and nut means threaded on said sleeve above said shoulder and adapted to bottom on said shoulder.

15. The combination set forth in claim 14 wherein said first flexible means is a braided metal cable.

References Cited

UNITED STATES PATENTS

| | | | |
|---|---|---|---|
| 2,088,553 | 7/1937 | Olsen | 73—478 |
| 2,656,710 | 10/1953 | Weaver et al. | 73—471 |

JAMES J. GILL, Primary Examiner